United States Patent
Williams et al.

(10) Patent No.: US 10,569,631 B1
(45) Date of Patent: Feb. 25, 2020

(54) SELF-CLEANING WEATHER STRIP SEAL

(71) Applicant: Toyota Motor Engineering & Manufacturing North America, Inc., Plano, TX (US)

(72) Inventors: Paxton S. Williams, Milan, MI (US); Mohan Ramachandra Kulkarni, Novi, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/114,655

(22) Filed: Aug. 28, 2018

(51) Int. Cl.
*B60J 10/84* (2016.01)

(52) U.S. Cl.
CPC ..................... *B60J 10/84* (2016.02)

(58) Field of Classification Search
CPC .................. B60J 10/84; B60J 10/86
See application file for complete search history.

(56) References Cited

U.S. PATENT DOCUMENTS

| | | | |
|---|---|---|---|
| 4,761,917 A | 8/1988 | Knecht et al. | |
| 4,805,347 A | 2/1989 | Smith | |
| 4,924,629 A | 5/1990 | Smith et al. | |
| 4,952,442 A * | 8/1990 | Warner | B60J 10/242 428/83 |
| 5,046,285 A | 11/1991 | Fratini, Jr. et al. | |
| 5,079,873 A | 1/1992 | Smith | |
| 7,219,899 B2 | 5/2007 | Kesseg | |
| 9,096,113 B2 * | 8/2015 | Kast | B60J 10/242 |
| 2004/0031203 A1 * | 2/2004 | Russell | B60J 10/24 49/498.1 |
| 2004/0137197 A1 * | 7/2004 | Watanabe | B60J 10/242 428/122 |
| 2004/0145213 A1 * | 7/2004 | Watanabe | B60J 10/242 296/146.9 |
| 2006/0010779 A1 | 1/2006 | Schlachter et al. | |
| 2017/0074035 A1 | 3/2017 | Eansor | |
| 2017/0342767 A1 | 11/2017 | Sakakibara et al. | |

* cited by examiner

*Primary Examiner* — Jason S Morrow
(74) *Attorney, Agent, or Firm* — Christopher G. Darrow; Darrow Mustafa PC

(57) ABSTRACT

A self-cleaning weather strip seal is provided for a vehicle. The self-cleaning weather strip seal includes an attachment portion configured to couple the self-cleaning weather strip seal to a vehicle component. The seal includes a main body portion having a length dimension and a width dimension. The main body portion includes a flexible wall that defines an interior region configured to retain a volume of air. A relief opening is defined in the main body portion and provides selective fluid communication from the interior region to an external environment. Upon receiving a compressive force on the main body portion, the relief opening is aligned and configured to direct pressurized air toward a surface of the vehicle susceptible for accumulating debris. In various aspects, the main body portion defines a plurality of chambers aligned in a series along the length dimension.

19 Claims, 4 Drawing Sheets

SELF-CLEANING WEATHER STRIP SEAL

TECHNICAL FIELD

The present disclosure generally relates to weather strip seals and, more particularly, to a self-cleaning weather strip seal disposed between components of a vehicle.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

The use of weather strip seals is common between different areas of a vehicle in order to prevent or minimize moisture/debris from entering and potentially damaging certain spaces due to corrosion, or the like. For example, vehicle door frames may be provided with weather strip seals around at least a portion of their perimeter to keep air, water, and noise out of the passenger cabin. While the moisture/debris, for example, does not enter the passenger cabin, it may still collect in areas and on surfaces adjacent to the door frame, such as on a door rocker or door sill area, or under the weather strip seal itself. With normal road driving, in combination with typical door vibrations, this collection of moisture/debris can cause frictional contact and abrasion through vehicle paint. For example, the abrasion can wear through various layers, including ED and zinc layers, eventually leading to corrosion. While one alternative can be to place anti-chip tape on the painted surface adjacent a lip of the weather strip seal, this requires additional labor and material costs.

Accordingly, it would be desirable to provide an improved weather strip seal that can assist in the removal of contaminates in order to minimize and ultimately prevent their negative affect to the paint or finish of adjacent components.

SUMMARY

This section provides a general summary of the disclosure, and is not a comprehensive disclosure of its full scope or all of its features.

In various aspects, the present teachings provide a self-cleaning weather strip seal for a vehicle. The self-cleaning weather strip seal includes an attachment portion configured to couple the self-cleaning weather strip seal to a vehicle component. The seal includes a main body portion having a length dimension and a width dimension. The main body portion includes a flexible wall that defines an interior region configured to retain a volume of air. A relief opening is defined in the main body portion and provides selective fluid communication from the interior region to an external environment. Upon receiving a compressive force on the main body portion, the relief opening is aligned and configured to direct pressurized air toward a surface of the vehicle susceptible for accumulating debris. In various aspects, the main body portion defines a plurality of chambers aligned in a series along the length dimension, wherein each of the plurality of chambers defines a respective interior region and at least one relief opening. The chambers can be independent of one another, or can be provided with fluid communication through inner chamber walls.

In other aspects, the present teachings provide a self-cleaning weather strip seal for a door of a vehicle. The self-cleaning weather strip seal includes an attachment portion configured to couple the self-cleaning weather strip seal to a door component. The seal includes a main body portion having a flexible wall extending in a length dimension and a width dimension. The main body portion includes a plurality of chambers aligned in a series along the length dimension. Each of the plurality of chambers defines a respective interior region configured to retain a volume of air. A relief opening is provided in each chamber and permits selective fluid communication from the respective interior region to an external environment. Upon receiving a compressive force on the main body portion, the relief openings are aligned and configured to direct pressurized air toward a bottom surface of a door sill of the vehicle to remove any accumulated debris.

In still other aspects, the present teachings are directed to a method for removing debris from adjacent a door sill of a vehicle. The method includes providing a self-cleaning weather strip seal coupled to a door component. The weather strip seal may include an attachment portion configured to couple the self-cleaning weather strip seal to the door component. A main body portion is provided having a length dimension and a width dimension. At least a portion of the main body portion defines an interior region configured to retain a volume of air. The weather strip seal includes a relief opening defined in the main body portion providing selective fluid communication between the interior region and an external environment. The method includes permitting a closing operation of a vehicle door to compress the main body portion of the weather strip seal, thereby creating a pressure in the interior region. Upon exceeding a threshold pressure, the method includes directing compressed air from the interior region of the main body portion through the relief opening and toward a bottom surface of the door sill, thereby removing the debris.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides self-cleaning weather strip seals for sealing various gaps that may be formed at an interface between at least two vehicle components. More specifically, the present technology provides a self-cleaning weather strip for a door sill area, sometimes referred to as a door rocker area. The self-cleaning weather strip seal includes an attachment portion configured to couple the self-cleaning weather strip seal to a vehicle component, such as a door weather strip adjacent a door sill. The seal includes a main body portion having a length dimension and a width dimension. The main body portion includes a flexible wall that defines an interior region configured to retain a volume of air. A relief opening is defined in the main body portion and provides selective fluid communication from the interior region to an external environment. Upon receiving a compressive force on the main body portion from another vehicle component, such as a vehicle door, the relief opening is aligned and configured to direct pressurized air toward a surface of the vehicle susceptible for accumulating debris. In various aspects, the main body portion may define a plurality of chambers aligned in a series along the length dimension, wherein each of the plurality of chambers defines a respective interior region and at least one relief opening.

Figure 1:
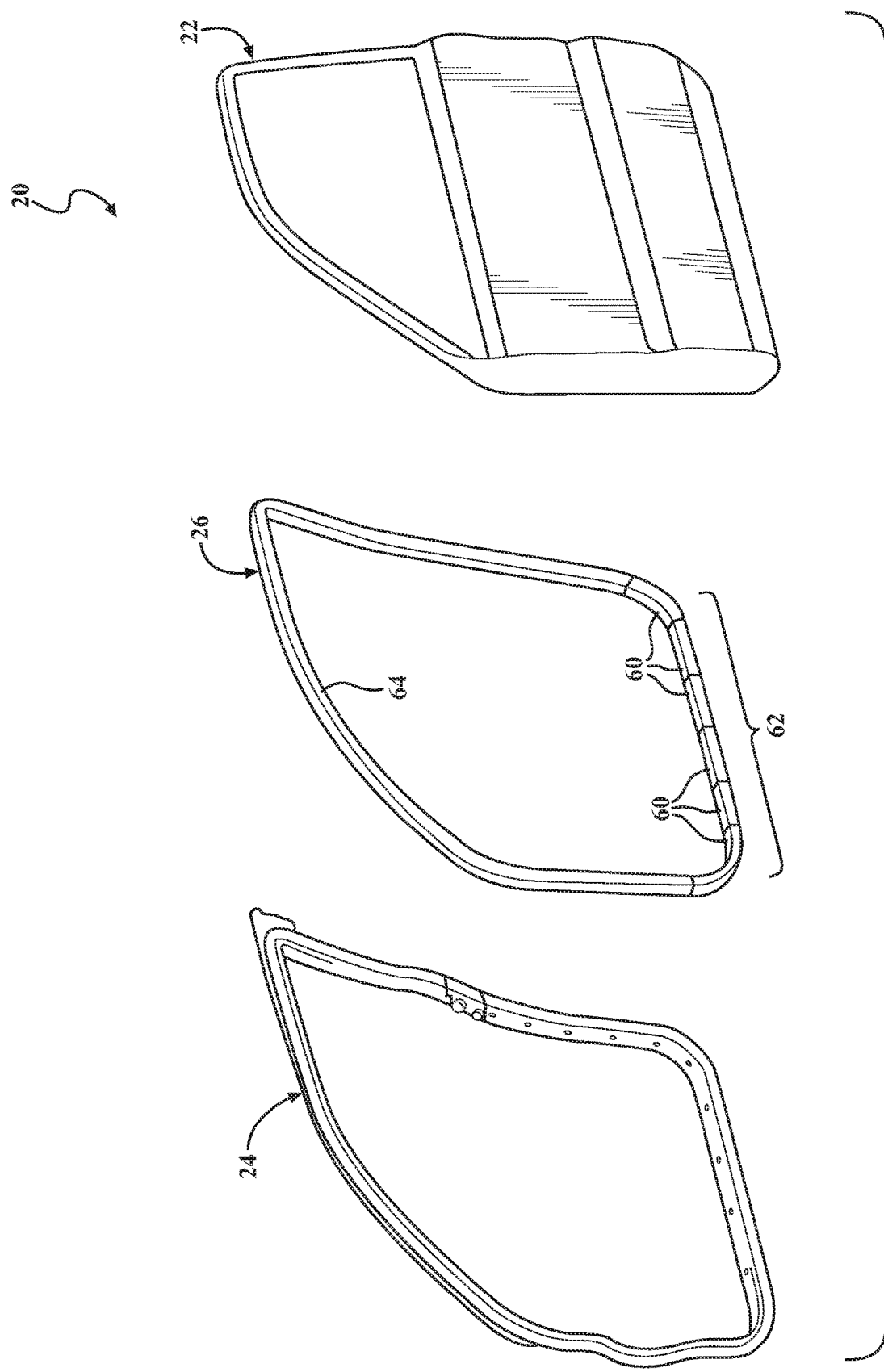
FIG. 1 is a side perspective view of an exploded vehicle door assembly including a vehicle door, a vehicle door weather strip, and a weather strip seal according to various aspects of the present technology.

By way of context, FIG. 1 is a side perspective view of an exploded vehicle door assembly 20 including a vehicle door 22, a vehicle door weather strip 24, and a self-cleaning weather strip seal 26 according to various aspects of the present technology. The vehicle door 22 and vehicle door weather strip 24 of FIG. 1 are simply provided as non-limiting examples of environments where the self-cleaning weather strip seal 26 may be useful, and the details of their design may vary greatly between different vehicles. The self-cleaning weather strip seal 26 may be provided defining a continuous perimeter that essentially conforms to a shape of the outer perimeter of the vehicle door 22. In other aspects, the self-cleaning weather strip 26 may be provided as a linear extending seal to seal various other areas of a vehicle. As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc.

While the present technology may be described and presented in the drawings with respect to a vehicle door seal, it should be understood that the self-cleaning weather strip seal 26 disclosed herein may be used with a variety of different vehicle components and may be used to seal various gaps that may be present between first and second components of a vehicle. For example, the self-cleaning weather strip seal can alternatively be used to close a gap between a trunk and a rear area of the vehicle, as well as between a hood and a front area of the vehicle, and the like, especially where there is a high likelihood that debris will collect at or near an area adjacent to the weather strip seal.

Figure 2:
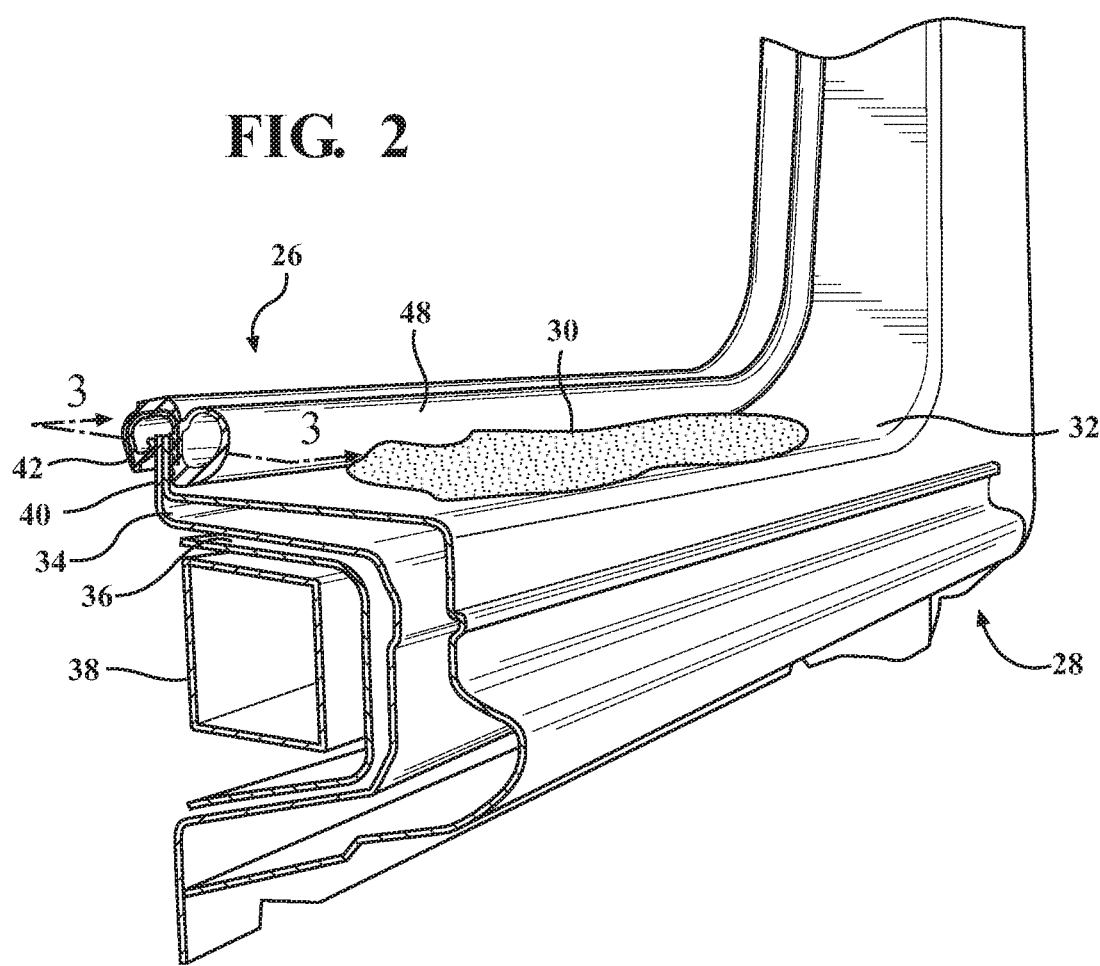
FIG. 2 is a partial side perspective view of a door sill of a vehicle having an accumulation of debris on a bottom surface of the door sill, adjacent a self-cleaning weather strip seal.

FIG. 2 is a partial side perspective view of an exemplary door sill 28 of a vehicle, illustrated as having an accumulation of debris 30 on a bottom surface 32 of the door sill 28, adjacent a self-cleaning weather strip seal 26. As used herein, the term "debris" is meant to include any foreign matter, waste, or substance, solid or liquid, which does not normally belong on a surface of a vehicle component. This includes corrosive and non-corrosive substances, such as dirt, dust, sand, salts, snow, ice, precipitation, leaves, organic matter, and the like. As shown in FIG. 2, the exemplary door sill 28 may be coupled directly or indirectly to various other internal structural members 34, 36 that may ultimately be coupled to a portion of a vehicle frame member 38. At least one of the structural members 28, 34, 36 defines an upstanding flange 40, or the like, configured for securing to an attachment portion 42 of the self-cleaning weather strip seal 26.

Figure 3:
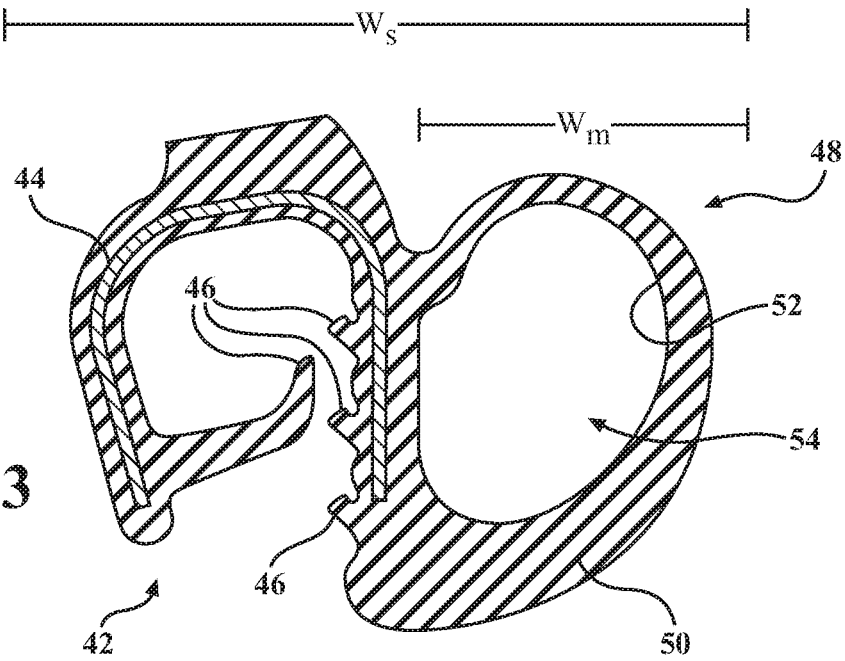
FIG. 3 is a cross-sectional view of the self-cleaning weather strip seal of FIG. 2 taken along the line 3-3 according to one aspect.

FIG. 3 is a cross-sectional view of the self-cleaning weather strip seal 26 of FIG. 2 taken along the line 3-3 according to one aspect. The seal 26 may be formed of various known materials known for their ability to form a seal and revert to their original shape after being compressed for a period of time. The seal 26 may be formed as a monolithic component, or may be formed of multiple sections joined together. As shown, the attachment portion 42 may include an internal structural component 44 generally configured for stiffening and adding rigidity to the attachment portion 42. The internal structural component 44 may be plastic, metal, or a similar reinforcing material. The internal structural component 44 may be present along an entirety of a length ("L", FIG. 4) of the weather strip seal 26, or in one or more strategic localized regions. The attachment portion 42 may include a plurality of gripping prongs 46, or the like, configured to assist in securing/gripping the weather strip seal 26 to the vehicle component, or flange 40.

A main body portion 48 is generally provided opposite the attachment portion 42. The main body portion 48 may be provided with a generally bulbous shape and may be shaped, designed, and otherwise configured to revert to its original shape after being deformed or compressed in a sealing position. A width dimension of the self-cleaning weather strip is indicated by ("$W_s$") and a width dimension of the main body portion is indicated by ("$W_m$"). The main body portion 48 may include a substantially circular shaped flexible wall 50 that defines an inner surface 52 and an interior region 54 that is configured to retain a volume of air. The flexible wall 50 may be provided with a variable thickness in order to provide a controlled collapse. As will be discussed in more detail below, at least one relief opening 56 may be provided defined in the flexible wall 50. The relief opening 56 is generally configured to provide fluid communication between the interior region 54 and an external environment 58.

Figure 4:
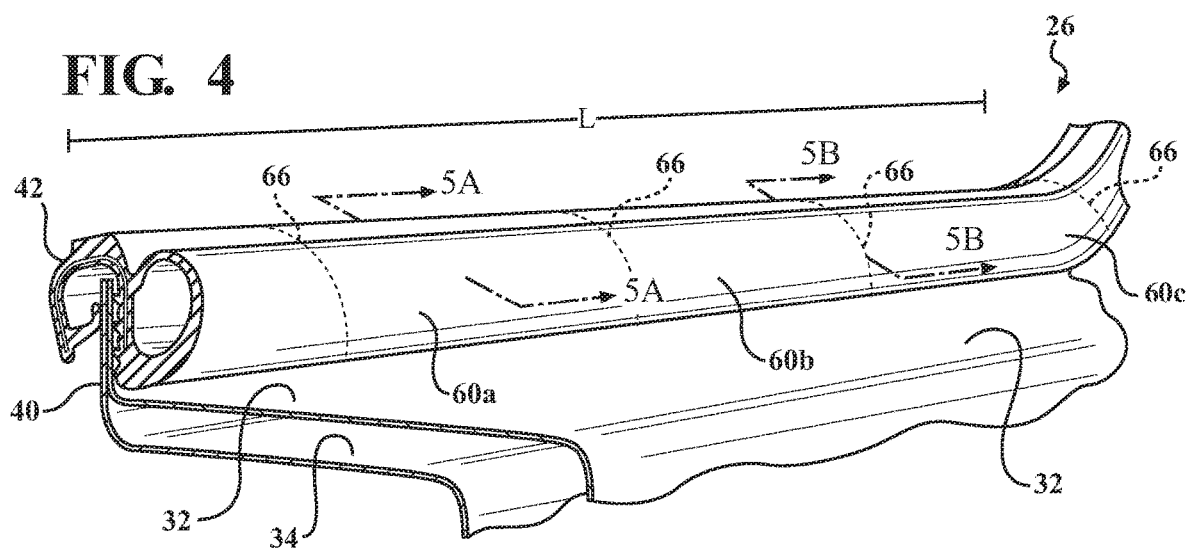
FIG. 4 is a partial side perspective view of a door sill of a vehicle adjacent a self-cleaning weather strip seal that includes a plurality of chambers aligned along a length dimension.

FIG. 4 is a partial side perspective view of a door sill 28 of a vehicle adjacent a self-cleaning weather strip seal 26 where the main body portion 48 includes a plurality of chambers 60a, 60b, 60c aligned adjacent one another in a series along a length dimension ("L"). With renewed reference to FIG. 1, the plurality of chambers 60 may be located at a lower region 62 of the self-cleaning weather strip seal 26, while the remaining area 64 of the self-cleaning weather strip 26 may not be provided with separate chambers because that area 64 may not be a region that accumulates debris. In other aspects (not shown), the entire self-cleaning weather strip seal 26 may be divided into separate or independent chambers 60. Each chamber 60 defines a respective interior region 54 and preferably at least one relief opening 56. The relief openings 56 may vary in shape, location and size depending upon the desired characteristics.

Figure 5A:
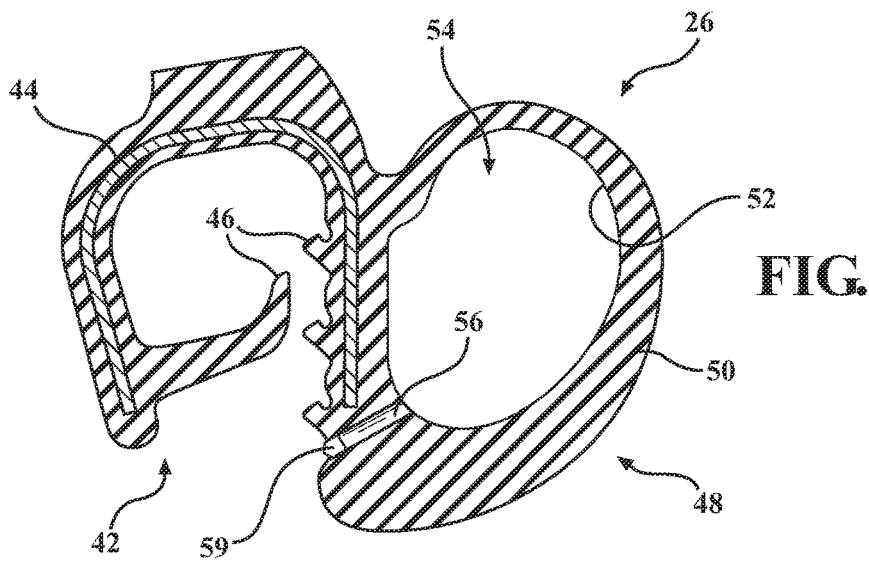
FIG. 5A is a cross-sectional view of the self-cleaning weather strip seal of FIG. 4 taken along the line 5A-5A according to one aspect, illustrating a relief opening.
Figure 5B:
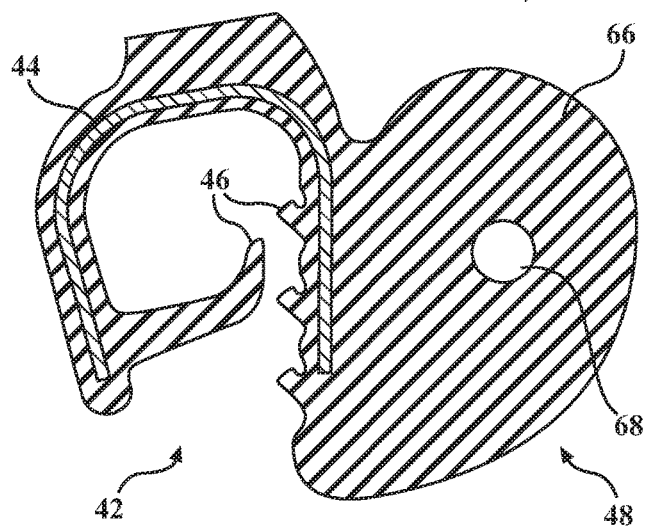
FIG. 5B is a cross-sectional view of the self-cleaning weather strip seal of FIG. 4 taken along the line 5B-5B according to one aspect, illustrating an internal chamber wall separating adjacent chambers.

FIG. 5A is a cross-sectional view of the self-cleaning weather strip seal 26 of FIG. 4 taken along the line 5A-5A according to one aspect, and illustrating a relief opening 56. FIG. 5B is a cross-sectional view of the self-cleaning weather strip seal of FIG. 4 taken along the line 5B-5B according to one aspect, and illustrating an internal chamber wall 66 separating adjacent chambers 60. The internal chamber walls 66 may be integrally formed with the main body portion 48, such as integrally formed with the flexible wall 50, or may be separate components that are provided in the main body portion 48 of the seal 26. In various aspects the relief opening 56 may be a slit or a cavity that is defined within the flexible wall 50 of the main body portion 48. The relief openings 56 may be strategically located, shaped, sized, angled, and otherwise configured to provide selective fluid communication between the interior region 54 and the external environment 58. For example, the interior region 54 may be provided with a volume of air. Upon receiving a compressive force against the main body portion 48, a portion of the flexible wall 50 may deform and flex inwardly, increasing a pressure of the volume of air. As will be discussed below, after exceeding a predetermined or threshold pressure, pressurized air is directed through the relief opening 56 and toward a surface of the vehicle susceptible for accumulating debris, for example, a bottom surface 32 of the door sill 28. The rapid blast of pressurized air through each relief opening 56 will remove the debris 30, including liquids, from collecting, sitting, and abrading on various painted surfaces, which will prevent and/or minimize corrosion and increase a life span of the vehicle components.

In various aspects, the inner chamber walls 66 may be separated a distance from one another such that individual chambers 60 are provided with a length dimension of from about 25 mm to about 150 mm, or from about 50 mm to about 100 mm. The plurality of individual chambers 60 may be provided with equal lengths, or may be provided with different lengths, depending on the desired pressure that will be directed through the relief chambers 56. In various aspects, one or more of the relief chambers 56 may be provided with a one-way valve 59, or similar limiting device, in order to minimize the introduction of debris into the interior region 54 of the main body portion 48. As shown in FIG. 5B, at least one of the plurality of internal chamber walls 66 may include a defined opening 68 or a valve that is configured to provide fluid communication between adjacent chambers 60. In other aspects, each of the plurality of chambers 60 may be configured to independently direct pressurized air from the respective interior regions 54 toward the surface of the vehicle susceptible for accumulating the debris. Additional vents may be provided (not specifically shown) at various locations in order to allow an inflow of air back into the interior region after the main body portion 48 expels it pressurized air and returns to its original shape.

Figure 6:
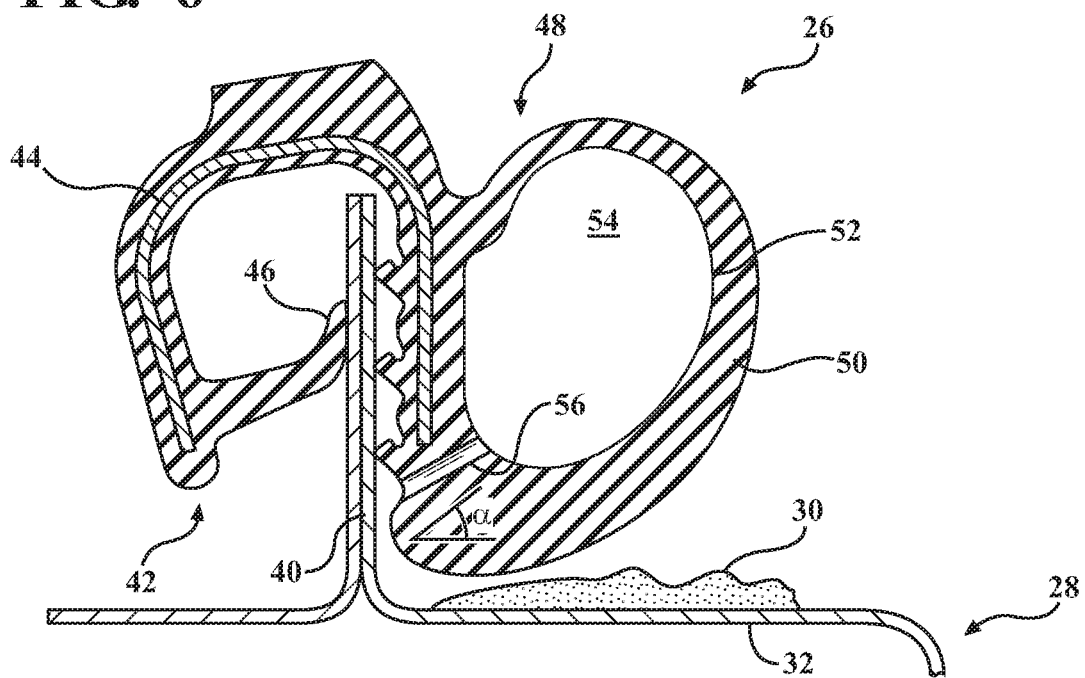
FIG. 6 is a cross-sectional view of the self-cleaning weather strip seal similar to FIG. 5A, illustrating an accumulation of debris on a bottom surface of a door sill and near the self-cleaning weather strip seal.

FIG. 6 is a cross-sectional view of the self-cleaning weather strip seal similar to FIG. 5A, coupled to a flange 40 and illustrating an accumulation of debris on a bottom surface 32 of a door sill 28 and near the self-cleaning weather strip seal 26. As shown in FIG. 6, the relief openings 56 may be provided defining an angle α of from about 30 degrees to about 60 degrees with respect to a bottom surface 32 of the door sill 28. In various aspects, angle α may be from about 40 degrees to about 50 degrees, or about 45 degrees.

Figure 7:
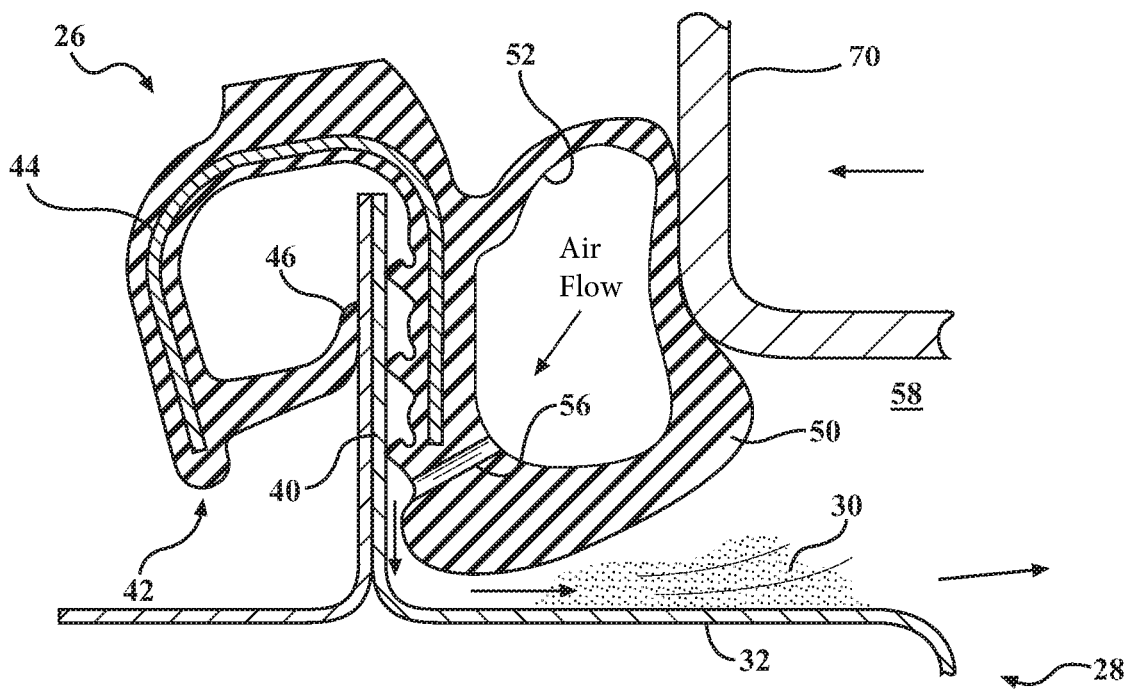
FIG. 7 is a cross-sectional view of the self-cleaning weather strip seal similar to FIG. 6, and illustrating a closing operation of a vehicle door to compress the main body portion of the weather strip seal, thereby creating a pressure in the interior region where compressed air is directed from the interior region of the main body portion through the relief opening and toward a bottom surface of the door sill, thereby removing the debris.

FIG. 7 is a cross-sectional view of the self-cleaning weather strip seal 26 similar to FIG. 6, and illustrating a closing operation of a vehicle door 70 to compress the main body portion 48 of the self-cleaning weather strip seal 26, thereby creating a pressure in the interior region 54. Upon reaching a threshold internal pressure, the compressed air is directed from the interior region 54 of the main body portion through the relief opening 56 and toward a bottom surface 32 of the door sill 28, thereby removing the debris 30 away from the seal 26.

The present technology is also directed to methods for removing debris 30 from a vehicle component, such as an area of surface 32 adjacent a door sill 28 of a vehicle. The method includes providing a self-cleaning weather strip seal 26 coupled to a vehicle component such as a flange 40 of a door weather strip component 24, or the like. As described in detail above, the weather strip seal 26 may include an attachment portion 42 configured to couple the self-cleaning weather strip seal 26 to the door component. A main body portion 48 is provided having a length dimension and a width dimension. At least a portion of the main body portion 48 defines an interior region 54 configured to retain a volume of air. The weather strip seal 26 includes a relief opening 56 defined in the main body portion 48, for example in a flexible wall 50, providing selective fluid communication between the interior region 54 and an external environment 58. The method includes permitting a closing operation of a vehicle component, such as a vehicle door 70 to compress the main body portion 48 of the weather strip seal 26, for example, in a width dimension, thereby creating a pressure in the interior region 54. Upon exceeding a threshold pressure, the method includes directing compressed air from the interior region 54 of the main body portion 48 through the relief opening 56 and toward a bottom surface 32 of the door sill 28, thereby removing the debris 30.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A self-cleaning weather strip seal for a vehicle, the self-cleaning weather strip seal comprising:
    an attachment portion configured to couple the self-cleaning weather strip seal to a vehicle component;
    a main body portion having a length dimension and a width dimension, the main body portion comprising a plurality of chambers aligned in a series along the length dimension, each of the plurality of chambers comprises a flexible wall that defines a respective interior region configured to retain a volume of air; and
    a relief opening defined in each chamber of the main body portion and providing selective fluid communication from the respective interior region to an external environment, wherein upon receiving a compressive force on the main body portion, the relief opening is aligned and configured to direct pressurized air toward a surface of the vehicle susceptible for accumulating debris.

2. The self-cleaning weather strip seal according to claim 1, wherein the main body portion comprises a plurality of internal chamber walls separating the chambers.

3. The self-cleaning weather strip seal according to claim 2, wherein at least one of the plurality of internal chamber walls is configured to provide fluid communication between adjacent chambers.

4. The self-cleaning weather strip according to claim 3, wherein the at least one of the plurality of internal chamber walls comprises a defined opening or a valve configured to provide the fluid communication between adjacent chambers.

5. The self-cleaning weather strip seal according to claim 1, wherein each of the plurality of chambers has a length dimension of from about 50 mm to about 100 mm.

6. The self-cleaning weather strip seal according to claim 1, wherein each of the plurality of chambers is configured to independently direct pressurized air from the respective interior regions toward the surface of the vehicle susceptible for accumulating debris.

7. A self-cleaning weather strip seal for a vehicle, the self-cleaning weather strip seal comprising:
    an attachment portion configured to couple the self-cleaning weather strip seal to a vehicle component;
    a main body portion having a length dimension and a width dimension, the main body portion comprising a flexible wall that define an interior region configured to retain a volume of air; and
    a relief opening defined in the main body portion and providing selective fluid communication from the interior region to an external environment, wherein upon receiving a compressive force on the main body portion, the relief opening is aligned and configured to direct pressurized air toward a surface of the vehicle susceptible for accumulating debris,
    wherein the relief opening comprises one of a defined cavity or a slit configured to open after the volume of air in the interior region exceeds a threshold pressure.

8. The self-cleaning weather strip seal according to claim 7, wherein the relief opening comprises a one-way valve.

9. A self-cleaning weather strip seal for a door of a vehicle, the self-cleaning weather strip seal comprising:
    an attachment portion configured to couple the self-cleaning weather strip seal to a door component;
    a main body portion having a flexible wall extending in a length dimension and a width dimension, the main body portion comprising a plurality of chambers aligned in a series along the length dimension, wherein each of the plurality of chambers defines a respective interior region configured to retain a volume of air; and
    a relief opening defined in each chamber and providing selective fluid communication from the respective interior region to an external environment, wherein upon receiving a compressive force on the main body portion, the relief openings are aligned and configured to direct pressurized air toward a bottom surface of a door sill of the vehicle to remove any accumulated debris.

10. The self-cleaning weather strip seal according to claim 9, wherein the relief openings are defined at an angle of between about 30 degrees to about 60 degrees with respect to the bottom surface of the door sill.

11. The self-cleaning weather strip seal according to claim 9, wherein the main body portion comprises a plurality of internal chamber walls separating the plurality of chambers.

12. The self-cleaning weather strip seal according to claim 9, wherein at least one of the plurality of internal chamber walls is configured to provide fluid communication between adjacent chambers.

13. The self-cleaning weather strip seal according to claim 9, wherein each of the plurality of chambers has a length dimension of from about 50 mm to about 100 mm.

14. A method for removing debris from adjacent a door sill of a vehicle, the method comprising:
    providing a self-cleaning weather strip seal coupled to a door component, the weather strip seal comprising:

an attachment portion configured to couple the self-cleaning weather strip seal to the door component;

a main body portion having a length dimension and a width dimension, at least a portion of the main body portion defining an interior region configured to retain a volume of air; and a relief opening defined in the main body portion providing selective fluid communication between the interior region and an external environment;

permitting a closing operation of a vehicle door to compress the main body portion of the weather strip seal, thereby creating a pressure in the interior region;

upon exceeding a threshold pressure, directing compressed air from the interior region of the main body portion through the relief opening and toward a bottom surface of the door sill, thereby removing the debris.

15. The method according to claim 14, wherein permitting the closing operation of the vehicle door to compress at least a portion of the weather strip seal comprises compressing the main body portion in the width dimension.

16. The method according to claim 14, wherein the relief opening comprises one of a defined cavity or a slit configured to open after the volume of air in the interior region exceeds the threshold pressure.

17. The method according to claim 16, wherein the relief opening is defined at an angle of between about 30 degrees to about 60 degrees with respect to the bottom surface of the door sill.

18. The method according to claim 14, wherein the main body portion defines a plurality of chambers aligned in a series along the length dimension, and each chamber is configured to direct compressed air from respective interior regions through relief openings and toward the bottom surface of the door sill, thereby removing the debris.

19. The method according to claim 18, wherein at least two of the plurality of chambers are in fluid communication with each other.

* * * * *